United States Patent
Nakamura et al.

(10) Patent No.: US 10,423,048 B2
(45) Date of Patent: Sep. 24, 2019

(54) CAVITY AND QUANTUM COMPUTER

(71) Applicant: KABUSHIKI KAISHA TOSHIBA, Minato-ku (JP)

(72) Inventors: Satoshi Nakamura, Tokyo (JP); Kouichi Ichimura, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 95 days.

(21) Appl. No.: 15/872,638

(22) Filed: Jan. 16, 2018

(65) Prior Publication Data
US 2018/0157150 A1 Jun. 7, 2018

Related U.S. Application Data

(63) Continuation of application No. 15/442,939, filed on Feb. 27, 2017, now Pat. No. 9,910,340.

(30) Foreign Application Priority Data

Jun. 30, 2016 (JP) .................. 2016-130860

(51) Int. Cl.
*G02F 3/00* (2006.01)
*G02B 5/30* (2006.01)
(Continued)

(52) U.S. Cl.
CPC ............. *G02F 3/00* (2013.01); *G02B 5/3083* (2013.01); *G02B 17/004* (2013.01); *G06N 10/00* (2019.01); *B82Y 10/00* (2013.01); *Y10S 977/933* (2013.01)

(58) Field of Classification Search
None
See application file for complete search history.

(56) References Cited

U.S. PATENT DOCUMENTS 5,528,612 A 6/1996 Scheps
5,541,946 A 7/1996 Scheps
(Continued)

FOREIGN PATENT DOCUMENTS

JP 6-50039 U 7/1994
JP 8-148739 6/1996
(Continued)

OTHER PUBLICATIONS

T. Pellizzari, et al., "Decoherence, Continuous Observation, and Quantum Computing: A Cavity QED Model", Physical Review Letters, vol. 75, (21), 1995, 4 pgs.
(Continued)

*Primary Examiner* — Jennifer D. Carruth
(74) *Attorney, Agent, or Firm* — Oblon, McClelland, Maier & Neustadt, L.L.P.

(57) ABSTRACT

According to one embodiment, a cavity with a cavity mode which is coupled to physical systems includes a spherical mirror and a plane mirror. The spherical mirror is provided at a birefringent crystal including the physical systems. The plane mirror is provided at the birefringent crystal opposite to the spherical mirror. The birefringent crystal has a first refractive index to light polarized in a first direction parallel to a polarization direction of the cavity mode on an optical axis of the cavity and a second refractive index to light polarized in a second direction parallel to the optical axis, the second refractive index being different from the first refractive index. A cavity length of the cavity and a mode waist radius of the cavity mode satisfy a specific condition.

20 Claims, 10 Drawing Sheets

(51) Int. Cl.
    *G02B 17/00*     (2006.01)
    *G06N 10/00*     (2019.01)
    *B82Y 10/00*     (2011.01)

(56) References Cited

U.S. PATENT DOCUMENTS

| | | | |
|---|---|---|---|
| 6,800,837 | B1 | 10/2004 | Ichimura et al. |
| 9,899,793 | B2 * | 2/2018 | Xing ............... H01S 3/1628 |
| 2007/0145348 | A1 | 6/2007 | Ichimura et al. |
| 2010/0088488 | A1 | 4/2010 | Ichimura et al. |
| 2010/0195104 | A1 | 8/2010 | Ichimura et al. |
| 2014/0218795 | A1 | 8/2014 | Scerbak |

FOREIGN PATENT DOCUMENTS

| | | |
|---|---|---|
| JP | 2001-209083 A | 8/2001 |
| JP | 2010-114336 | 5/2010 |
| JP | 4599290 | 12/2010 |
| JP | 4819531 | 11/2011 |
| JP | 5091813 | 12/2012 |
| JP | 5605992 | 10/2014 |

OTHER PUBLICATIONS

Hayato Goto, et al., "Cavity-enhanced spectroscopy of a rare-earth-ion-doped crystal: Observation of a power law for inhomogeneous broadening", Optics Express, vol. 21, (20), 2013, 12 pgs.

* cited by examiner

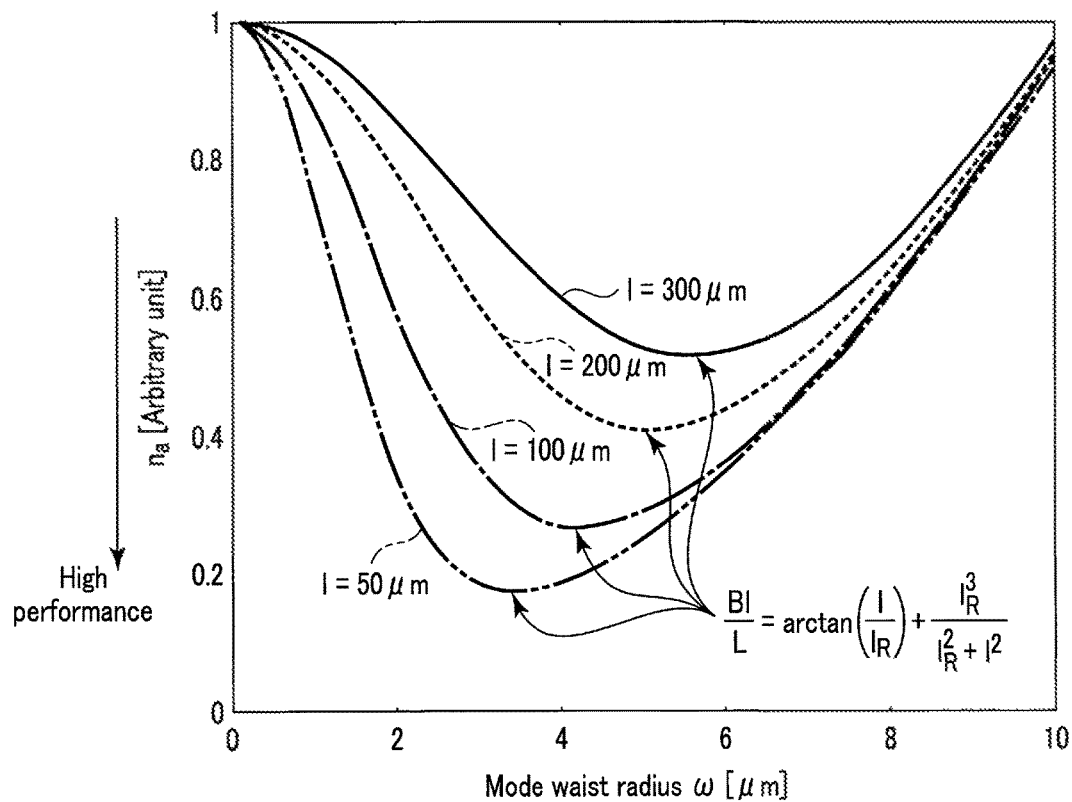
F I G. 5
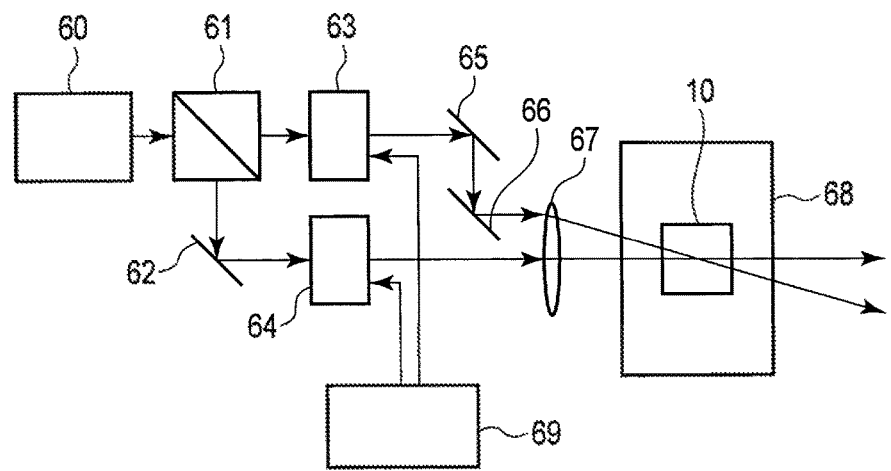
F I G. 6

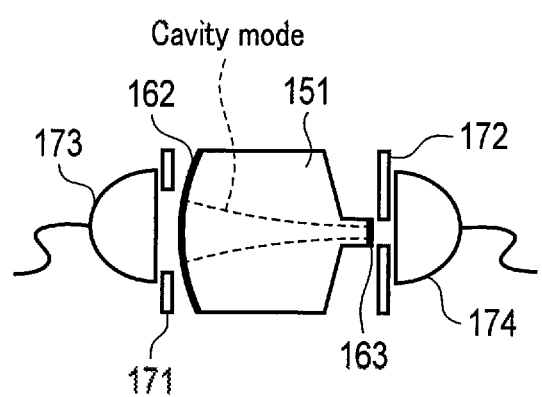
F I G. 19

CAVITY AND QUANTUM COMPUTER

CROSS-REFERENCE TO RELATED APPLICATIONS

This application is a continuation of U.S. application Ser. No. 15/442,939, filed Feb. 27, 2017 which is based upon and claims the benefit of priority from Japanese Patent Application No. 2016-130860, filed on Jun. 30, 2016, the entire contents of which are incorporated herein by reference.

FIELD

Embodiments described herein relate generally to a cavity which couples to physical systems and a quantum computer using the cavity.

BACKGROUND

In recent years, much effort has been made to research quantum computers based on coupling between a cavity and physical systems arranged in the cavity. In such a quantum computer, the physical systems which couple to a common cavity mode of the cavity are used as qubits (quantum bits). The quantum computer executes calculation by resonating the qubits with the common cavity mode to generate an interaction between the qubits, and in that state, optically manipulating the qubits. For the quantum computer, there has been a demand to increase the success probability of optical manipulation of the qubits referred to as quantum gate operation.

BRIEF DESCRIPTION OF THE DRAWINGS

FIG. 5 is a diagram illustrating the range of design parameters for the cavity according to the first embodiment.
FIG. 6 is a block diagram illustrating a quantum computer according to Example 2.

FIG. 19 is a diagram depicting a quantum computer according to Example 3.

DETAILED DESCRIPTION

According to one embodiment, a cavity with a cavity mode which is coupled to physical systems includes a spherical mirror and a plane mirror. The spherical mirror is provided at a birefringent crystal including the physical systems. The plane mirror is provided at the birefringent crystal and is opposed to the spherical mirror. The birefringent crystal has a first refractive index to light polarized in a first direction parallel to a polarization direction of the cavity mode on an optical axis of the cavity and a second refractive index to light polarized in a second direction parallel to the optical axis, the second refractive index being different from the first refractive index. A following expression is satisfied:

$$l_{1-} < l < l_{1+}$$

where $l_{1-}$ and $l_{1+}$ satisfy $$l_{1-}^3 - \left(\frac{3l_R^5}{l_0^2 + l_R^2} - 3l_R^2\right)l_{1-} - \frac{3l_R^4 A}{2\omega^2} = 0 \text{ and}$$

$$l_{1+}^3 - \left(\frac{3l_R^5}{l_0^2 + l_R^2} - 3l_R^2\right)l_{1+} - \frac{3l_R^4 A}{2\omega^2} = 0$$

in which $l_R = \omega^2 \pi n_2/\lambda$ and $l_0 = l_R L/A$, $l$ is a cavity length of the cavity, $\omega$ is a mode waist radius of the cavity mode, L is a total loss per one reciprocation in the cavity, A is a loss per one reciprocation in the cavity not dependent on the cavity length, $n_z$ is the second refractive index, and $\lambda$ is a wavelength of light in the cavity mode.

Hereinafter, embodiments will be described with reference to the drawings. In the following embodiments, like elements will be denoted by like reference symbols, and duplicate descriptions will basically be omitted.

First Embodiment

A quantum computer is known which includes a monolithic cavity including mirrors oppositely attached to a birefringent crystal. The quantum computer utilizes coupling between the cavity and physical systems arranged in the birefringent crystal. For such a cavity, efficient coupling between a cavity mode and the physical systems is desired. This can be achieved by reducing a cavity loss and a cavity relaxation rate (the rate at which energy of the cavity mode is lost per unit time). The cavity loss includes a loss resulting from coupling between modes (hereinafter referred to as a mode coupling loss). In the present embodiment, a technique for reducing the mode coupling loss will be described. When the quantum computer includes a cavity with efficient coupling between the cavity mode and the physical systems, it is possible to increase the success probability of quantum gate operation such as a quantum gate based on adiabatic passage.

Figure 1:
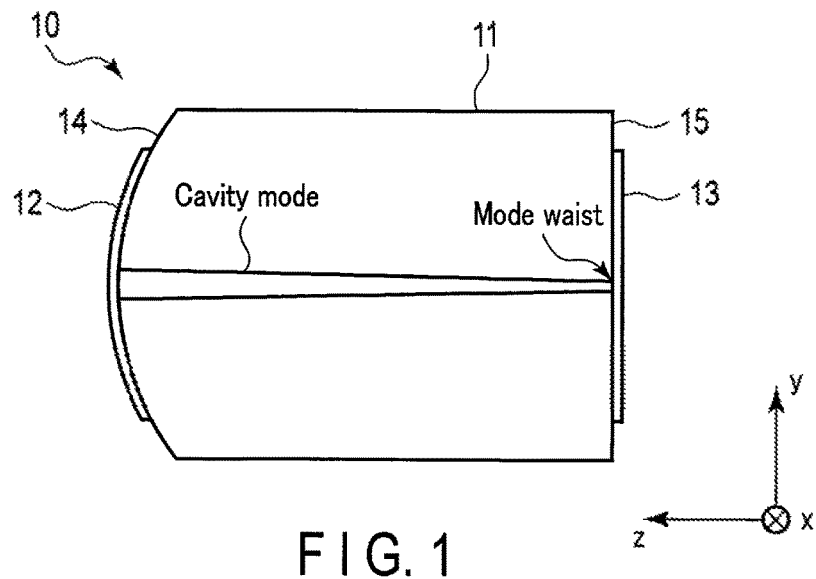
FIG. 1 is a sectional view depicting a cavity according to a first embodiment.
Figure 2:
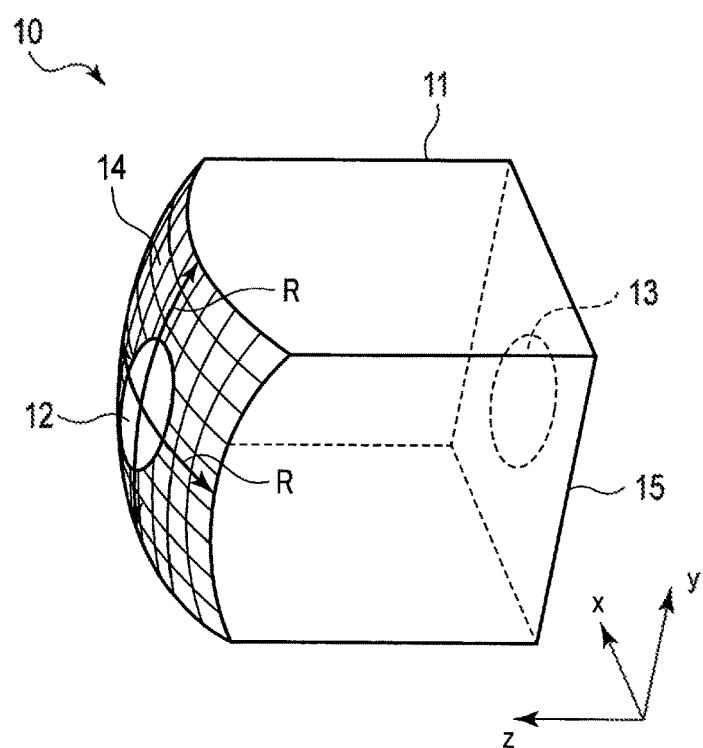
FIG. 2 is a perspective view depicting the cavity according to the first embodiment.

FIG. 1 and FIG. 2 are a sectional view and a perspective view, respectively, schematically depicting a cavity 10 according to a first embodiment. The cavity 10 is a monolithic Fabry-Perot cavity including a spherical mirror 12 attached to a surface 14 of birefringent crystal 11 and a plane mirror 13 attached to a surface 15 of the birefringent crystal 11 opposite to the spherical mirror 12, as depicted in FIG. 1 and FIG. 2. A radius of curvature of the spherical mirror 12 is represented as R in FIG. 2.

The birefringent crystal 11 includes therein physical systems (for example, atoms or ions) which couple to a common cavity mode of the cavity 10. In the present embodiment, a z-axis direction is defined as a direction parallel to an optical axis of the cavity 10, and x-axis direction is defined as a polarization direction of the common cavity mode, the polarization direction being on the optical axis of the cavity 10. The polarization direction refers to the direction of an electric field vector of light. In the birefringent crystal 11, a refractive index $n_x$ to light polarized in the x-axis direction (i.e., light with an electric light field parallel to the x-axis direction) is different from a refractive index $n_z$ to light polarized in the z-axis direction. In the cavity 10, a mode waist is formed on the plane mirror 13. The mode waist refers to an area where the cavity mode has the smallest spot size.

The present embodiment provides conditions for the cavity (cavity length and mode waist radius) under which a mode coupling loss occurring in the cavity 10 can be suppressed. First, the mode coupling loss in the birefringent crystal is formulated. The formulation includes (1) obtaining the refractive index of the birefringent crystal with respect to a wave number vector, (2) obtaining an electric field distribution of the cavity mode, (3) obtaining the spot size of the cavity mode and the radius of curvature of a wavefront of the cavity mode, and (4) obtaining a spatial distribution of the refractive index of the birefringent crystal and obtaining a mode coupling constant for a cavity length and a mode waist radius and a performance index of a computing element. Subsequently, based on the mode coupling loss formulated in accordance with the above-described procedure, (5) a condition is obtained under which the mode coupling loss is suppressed to enable high computing element performance to be achieved, (1) Refractive-Index Distribution (Wave Number Distribution)

Figure 3:
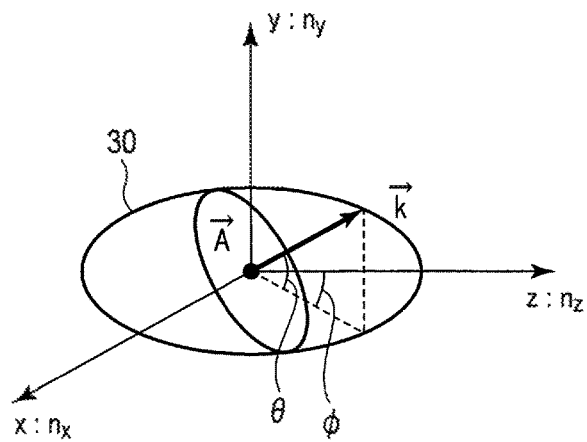
FIG. 3 is a diagram depicting an indicatrix.

In the birefringent crystal, the refractive index varies depending on the polarization direction and thus on a wave number vector. Thus, the refractive index with respect to any wave number vector is formulated. An indicatrix 30 in a coordinate system illustrated in FIG. 3 is expressed as follows.

$$\frac{x^2}{n_x^2} + \frac{y^2}{n_y^2} + \frac{z^2}{n_z^2} = 1$$

When the wave number vector is represented as $\vec{k}=(k_x,k_y,k_z)$, the refractive index is represented by the major diameter and minor diameter of a sectional ellipse cut out from the indicatrix at a plane perpendicular to the wave number vector. The sectional ellipse is expressed as follows based on polar coordinate indication.

$$\vec{A}(\varphi)=(n_x \cos\theta \cos\varphi, n_y \cos\theta \sin\varphi, n_z \sin\theta)$$

In the expression, $\theta$ is a function dependent on $\varphi$.

When the plane perpendicular to the wave number vector is represented as $\vec{S}=(x,y,z)$, the following expression holds true because $\vec{k}\cdot\vec{S}=0$.

$$k_x x+k_y y+k_z z=0$$

The sectional ellipse $\vec{A}$ lies on the plane $\vec{S}$, and thus the following expression holds true.

$$k_x n_x \cos\theta \cos\varphi+k_y n_y \cos\theta \sin\varphi+k_z n_z \sin\theta=0$$

From this expression, the following expression in which $\theta$ is expressed by a function of $\varphi$ is obtained.

$$\tan\theta = -\frac{k_x n_x \cos\varphi + k_y n_y \sin\varphi}{k_z n_z}$$

A distance r from the origin of the sectional ellipse is expressed as follows using $\theta$.

$$r(\vec{k},\varphi) = \sqrt{\frac{(n_x n_z k_z \cos\varphi)^2 + (n_y n_z k_z \sin\varphi)^2 + n_b^2(k_x n_x \cos\varphi + k_y n_y \sin\varphi)^2}{(k_x n_x \cos\varphi + k_y n_y \sin\varphi)^2 + (k_z n_z)^2}}$$

When $\varphi$ where r takes the maximum value is designated as $\varphi_1$ and $\varphi$ where r takes the minimum value is designated as $\varphi_2$, an intrinsic refractive index is represented as $n_j(\vec{k})=r(\vec{k},\varphi_j)$ (j=1,2). The wave number (the magnitude of the wave number vector) corresponding to each intrinsic refractive index is represented as $$k_j = \frac{2\pi}{\lambda} n_j(\vec{k}),$$

where $\lambda$ denotes the wavelength of light in the cavity mode. The wave number also satisfies $k_j=\sqrt{k_x^2+k_y^2+k_z^2}$, and thus, deletion of $k_x$ or $k_y$ allows the wave number $k_j$ to be expressed as a function of $k_y$ or $k_x$ and $k_z$. When $\varphi_1$ and $\varphi_2$ are approximated as $\varphi_1=\pi/2$ and $\varphi_2=0$, the intrinsic refractive index is expressed as follows.

$$n_1(k_x, k_z) = n_x\left\{1 + \frac{1}{2}\left(1 - \frac{n_x^2}{n_z^2}\right)\frac{k_z^2}{k_z^2}\right\}$$

$$n_2(k_y, k_z) = n_y\left\{1 + \frac{1}{2}\left(1 - \frac{n_y^2}{n_z^2}\right)\frac{k_y^2}{k_z^2}\right\}$$

(2) Formulation of Electric Field Distribution of the Cavity Mode

Using the formulated relation between the refractive index and the wave number, an electric field distribution of the cavity mode is expressed by the following integral (Fresnel-Kirchhoff's diffraction integral).

$$\vec{E}_j(x,y,z)=\iint dk_x dk_y \vec{A}_j(k_x,k_y)\exp[ik_x x+ik_y y+i\sqrt{k_j^2(k_x,k_y)-k_x^2-k_y^2}z]E_0(k_x,k_y)$$

In this expression, $E_0(k_x, k_y)$ represents an electric field distribution in a wave number vector space at the position of the mode waist (z=0), and $$E_0(k_x, k_y) \equiv \exp\left[-\frac{k_x^2 \omega_x^2 + k_y^2 \omega_y^2}{4}\right].$$

$\vec{A}_j(k_x, k_y)$ represents a vector representing a minor axis direction or a major axis direction of the sectional ellipse, and corresponds to the polarization direction of an electric field.

To perform the integration, a coefficient of z in an exponent part is expanded, to a second order of $k_x$ and $k_y$. Such, approximation is appropriate because the direction of the wave number vector near the optical axis of the cavity mode is similar to the z-axis direction and because $k_x$ and $k_y$ are small compared to the wave number. The electric field distribution of the cavity mode expanded to the second order of $k_x$ and $k_y$ is as follows.

$$\vec{E}_j(x, y, z) =$$
$$\int\int dk_x dk_y \vec{A}_j \exp\left[ik_x x + ik_y y + i(B_j + C_j k_x^2 + D_j k_y^2)z - \frac{k_x^2 \omega_x^2 + k_y^2 \omega_y^2}{4}\right]$$

$$B_1 = \frac{2\pi}{\lambda} n_x, \quad B_2 = \frac{2\pi}{\lambda} n_y, \quad C_1 = -\frac{\lambda n_x}{4\pi n_z^2}, \quad C_2 = -\frac{\lambda}{4\pi n_y},$$
$$D_1 = -\frac{\lambda}{4\pi n_x}, \quad D_2 = -\frac{\lambda n_y}{4\pi n_z^2}$$

The electric field distribution of the cavity mode is obtained as follows using an integral formula $$\int \exp(-\alpha x^2 - \beta x) dx =$$
$$\sqrt{\frac{\pi}{\alpha}} \exp\left(\frac{\beta^2}{4\alpha}\right) \cdot \vec{E}_j(x, y, z) = \frac{\pi A_1}{\sqrt{\left(\omega_x^2 + i\frac{\lambda}{\pi}\frac{n_x}{n_z^2}z\right)\left(\omega_y^2 + i\frac{\lambda}{\pi n_y}z\right)}}$$
$$\exp\left[-\frac{x^2}{\left(\frac{\omega_x^2}{4} + i\frac{\lambda}{4\pi}\frac{n_x}{n_z^2}z\right)} - \frac{y^2}{\left(\frac{\omega_y^2}{4} + i\frac{\lambda}{4\pi n_y}z\right)} - i\frac{2\pi}{\lambda} n_x z\right]$$

(3) Formulation of the Spot Size and the Radius of Curvature, of the Wavefront

Based on the electric field distribution of the cavity mode, the spot size of the mode and the radius of curvature at each point on the z axis (optical axis) are obtained. The following express relations between $x^2$ terms and $y^2$ terms in a mode j and spot sizes and $\omega_{jx}$ and $\omega_{jy}$ and the radii of curvature of the wavefront $R_{jx}$ and $R_{jy}$.

Real part of $x^2$ in the mode $$j = -\frac{x^2}{\omega_{jx}^2(z)}$$

Real part of $y^2$ in the mode $$j = -\frac{y^2}{\omega_{jy}^2(z)}$$

Imaginary part of $x^2$ in the mode $$j = -\frac{\pi n_x x^2}{\lambda R_{jx}^2(z)}$$

Imaginary part of $y^2$ in the mode $$j = -\frac{\pi n_y y^2}{\lambda R_{jy}^2(z)}$$

Therefore, the spot sizes and the radii of curvature of the wavefront are expressed as follows.

$$\omega_{1x}^2(z) = \omega_x^2\left[1 + \left(\frac{n_x^2 z}{n_z^2 z_{1y}}\right)^2\right] \quad R_{1x}(z) = \frac{n_x^2}{n_z^2} z\left[1 + \left(\frac{n_z^2 z_{1x}}{n_x^2 z}\right)^2\right]$$

$$\omega_{1y}^2(z) = \omega_y^2\left[1 + \left(\frac{z}{z_{1y}}\right)^2\right] \quad R_{1y}(z) = z\left[1 + \left(\frac{z_{1y}}{z}\right)^2\right]$$

$$\omega_{2x}^2(z) = \omega_x^2\left[1 + \left(\frac{z}{z_{2x}}\right)^2\right] \quad R_{2x}(z) = z\left[1 + \left(\frac{z_{2x}}{z}\right)^2\right]$$

$$\omega_{2y}^2(z) = \omega_y^2\left[1 + \left(\frac{n_y^2 z}{n_z^2 z_{2y}}\right)^2\right] \quad R_{2y}(z) = \frac{n_y^2}{n_z^2} z\left[1 + \left(\frac{n_z^2 z_{2y}}{n_y^2 z}\right)^2\right]$$

In the expressions, $$z_{jx} = \frac{\pi}{\lambda} n_j \omega_{jx}^2 \quad \text{and} \quad z_{jy} = \frac{\pi}{\lambda} n_j \omega_{jy}^2$$

are Rayleigh lengths. $\omega_{jx}$ is the waist size in the mode j in the x-axis direction, and $\omega_{jy}$ is the waist size in the mode j in the y-axis direction.

(4) Refractive Index Distribution (Spatial Distribution), the Performance Indices of the Mode Coupling Constant and the Computing Element A cavity formed of a birefringent medium involves a refractive index distribution formed in the medium in accordance with its cavity mode. The presence of such a refractive index distribution causes spatial modes (transverse modes) of polarized light beams to be coupled together. Thus, a coupling constant and a mode coupling loss are obtained for a case where a fundamental mode couples to an infinite number of higher modes. The performance index of a quantum computing element based on such a cavity is formulated. The coupling constant of mode coupling is proportional to a value resulting from integration, over the entire space, of the product of a refractive index distribution $n_j(x,y,z)$ and an electric field intensity $E(x,y,z)$. At this time, since an infinite number of higher modes are assumed to be present which couples to the fundamental mode, an effective coupling constant representing the sum of all the higher modes coupled together is not dependent on the type or number of the higher modes coupled together. The refractive index, distributions in the x- and y-axis distributions are expressed by the same function with different widths for each z due to the properties of Gaussian beams. Therefore, determination of a refractive index distribution $n_{si}(z)$ on the spot size for each z allows the coupling constant to be determined as follows.

$$g_i(\omega_x, l) \propto \iiint \delta n_i(z,y,z) E(x,y,z) dx dy dz \propto \int_0^l \delta n_{si}(z) dz$$

In the expression, $n_i(x,y,z) = n_i + \delta n_i(x,y,z)$ and $n_{si}(z) = n_i + \delta n_{si}(z)$, and l is a cavity length. A loss resulting from the mode coupling of polarization modes is considered to be proportional to the coupling constant ($L_1 \propto g_1$, $L_2 \propto g_2$).

The spatial distribution of the refractive index at each position can be obtained from $k_y/k_z$ and $k_x/k_z$ of the wave number vector. The inclination of a tangent of a curve connecting the spot sizes for each z in a plane with x=0 is designated as $k_y/k_z$ on the spot size for each z. The inclination of a tangent to a curve connecting the spot sizes for each z in a plane with y=0 is designated as $k_x/k_z$ on the spot size for each z. These values are obtained by differentiating $\omega_{1x}(z)$, etc. with respect to z. Based on $k_y/k_z$ and $k_x/k_z$ thus obtained, the spatial distribution of the refractive index on the spot can be obtained as follows.

$$n_x + \delta n_{s1}(z) = n_x + \frac{1}{2} n_x \left(1 - \frac{n_x^2}{n_z^2}\right) \frac{z^2}{z^2 + \frac{n_z^2}{n_x^2} z_{1x}^2} \frac{\omega_x^2 n_x^2}{z_{1x}^2 n_z^2}$$

$$n_y + \delta n_{s2}(z) = n_y + \frac{1}{2} n_y \left(1 - \frac{n_y^2}{n_z^2}\right) \frac{z^2}{z^2 + z_{2y}^2} \frac{\omega_y^2}{z_{2y}^2}$$

Such a refractive index distribution leads to coupling of modes. The relevant coupling constant is obtained as follows.

$$g_1(\omega_x, l) \propto \frac{1}{2} n_x \left(1 - \frac{n_x^2}{n_z^2}\right) \left[l - \frac{n_z}{n_x} z_{1x} \arctan\left(\frac{l n_x}{z_{1x} n_z}\right)\right] \left(\frac{\omega_x n_x^2}{z_{1x} n_z^2}\right)^2$$

$$g_2(\omega_y, l) \propto \frac{1}{2} n_y \left(1 - \frac{n_y^2}{n_z^2}\right) \left[l - z_{2y} \arctan\left(\frac{l}{z_{2y}}\right)\right] \left(\frac{\omega_y}{z_{2y}}\right)^2$$

Now, when the sum of the loss per cavity length other than the mode coupling loss and the transmissivity of the mirrors is represented as f(l), the loss to the cavity per cavity length is expressed as follows.

$$L_1(\omega_x, l) = L_0 \left[l - \frac{n_z}{n_x} z_{1x} \arctan\left(\frac{l n_x}{z_{1x} n_z}\right)\right] \left(\frac{\omega_x}{z_{1x}}\right)^2 + f(l)$$

$$L_2(\omega_y, l) = L_0 \left[l - z_{2y} \arctan\left(\frac{l}{z_{2y}}\right)\right] \left(\frac{\omega_y}{z_{2y}}\right)^2 + f(l)$$

In the expression, $L_0$ is a coefficient incorporating all proportionality coefficients for the mode coupling. Cavity relaxation rates $\kappa_1$, $\kappa_2$ for the respective polarization modes are expressed as follows.

$$\kappa_1(\omega_x, l) = \frac{cL_1(\omega_x, l)}{2\pi n_x l} = \frac{c}{2\pi n_x l} \left\{L_0 \left[l - \frac{n_z}{n_x} z_{1x} \arctan\left(\frac{l n_x}{z_{1x} n_z}\right)\right] \left(\frac{\omega_x}{z_{1x}}\right)^2 + f(l)\right\}$$

$$\kappa_2(\omega_x, l) = \frac{cL_2(\omega_y, l)}{2\pi n_y l} = \frac{c}{2\pi n_y l} \left\{L_0 \left[l - z_{2y} \arctan\left(\frac{l}{z_{2y}}\right)\right] \left(\frac{\omega_y}{z_{2y}}\right)^2 + f(l)\right\}$$

A performance index $n_{ai}$ determining the performance of the cavity as a element can be expressed as follows.

$$n_{ai} \equiv \kappa_i \gamma / g^2 \propto \kappa_i(\omega_x, l) \omega^2$$

A smaller value of the performance index is indicative of higher performance of the computing element. The performance index $n_{ai}$ is expressed as follows using $\kappa_1$, $\kappa_2$.

$$n_{a1} = c_1 \frac{z_{1x}}{l} \left\{L_0 \left[l - \frac{n_z}{n_x} z_{1x} \arctan\left(\frac{l n_x}{z_{1x} n_z}\right)\right] \left(\frac{\omega_x}{z_{1x}}\right)^2 + f(l)\right\}$$

$$n_{a2} = c_2 \frac{z_{2y}}{l} \left\{L_0 \left[l - z_{2y} \arctan\left(\frac{l}{z_{2y}}\right)\right] \left(\frac{\omega_y}{z_{2y}}\right)^2 + f(l)\right\}$$

In the expressions, $c_i$ is a constant incorporating all of the coefficients of $\gamma$ and g with respect to $\omega^2$, coefficients of $\kappa_i$, etc.

(5) Conditions for Suppressing the Loss and Achieving High Computing Element Performance Based on the expression of the performance index $n_{ai}$ for the cavity thus obtained, conditions are examined under which the loss can be suppressed to enable the performance of the cavity as a computing element to be enhanced. First, a condition is examined under which the optimal computing element performance is achieved when the loss other than the mode coupling loss does not depend on the cavity length ($f((l)) = AL_0$), where A represents a loss per one reciprocation in the cavity not dependent on the cavity length. In this case, $n_{ai}$ is expressed as follows.

$$n_{a1} = c_1 \frac{z_{1x}}{l} \left\{L_0 \left[l - \frac{n_z}{n_x} z_{1x} \arctan\left(\frac{l n_x}{z_{1x} n_z}\right)\right] \left(\frac{\omega_x}{z_{1x}}\right)^2 + AL_0\right\}$$

$$n_{a2} = c_2 \frac{z_{2y}}{l} \left\{L_0 \left[l - z_{2y} \arctan\left(\frac{l}{z_{2y}}\right)\right] \left(\frac{\omega_y}{z_{2y}}\right)^2 + AL_0\right\}$$

These expressions are differentiated to allow the optimal cavity length l to be expressed as follows.

$$\frac{lA}{L} = \frac{\omega^2 \pi n_z}{\lambda}$$

In the expression, L is the total loss per one reciprocation in the cavity. This optimal structure corresponds to a minimum in a graph illustrated in FIG. 4. The cavity length at which the performance index $n_{ai}$ takes the minimum is represented as $l_0$. In this optimal structure, the loss resulting from the mode coupling is suppressed to allow the performance index $n_{ai}$ to take the minimum. The effect of the inter-mode coupling is assumed to be significant, making the performance index $n_{ai}$ double the minimum. Then, when the minimum of $n_{ai}$ is represented as $n_{ai\ min}$, a cavity length $l_1$ which $n_{ai} = 2n_{ai\ min}$ satisfies the following relation.

$$l_1^3 = \left(\frac{3l_R^5}{l_0^2 + l_R^2} - 3l_R^2\right) l_1 - \frac{3l_R^4 A}{2\omega^2} = 0$$

When two of the solutions satisfying this formula are assumed to be $l_{1+}$, $l_{1-}$ ($l_{1+} > l_{1-}$), then in a structure that suppresses the loss resulting from the inter-mode coupling, the cavity length l may satisfy the following relation.

$$l_{1-} < l < l_{1+}$$

Figure 4:
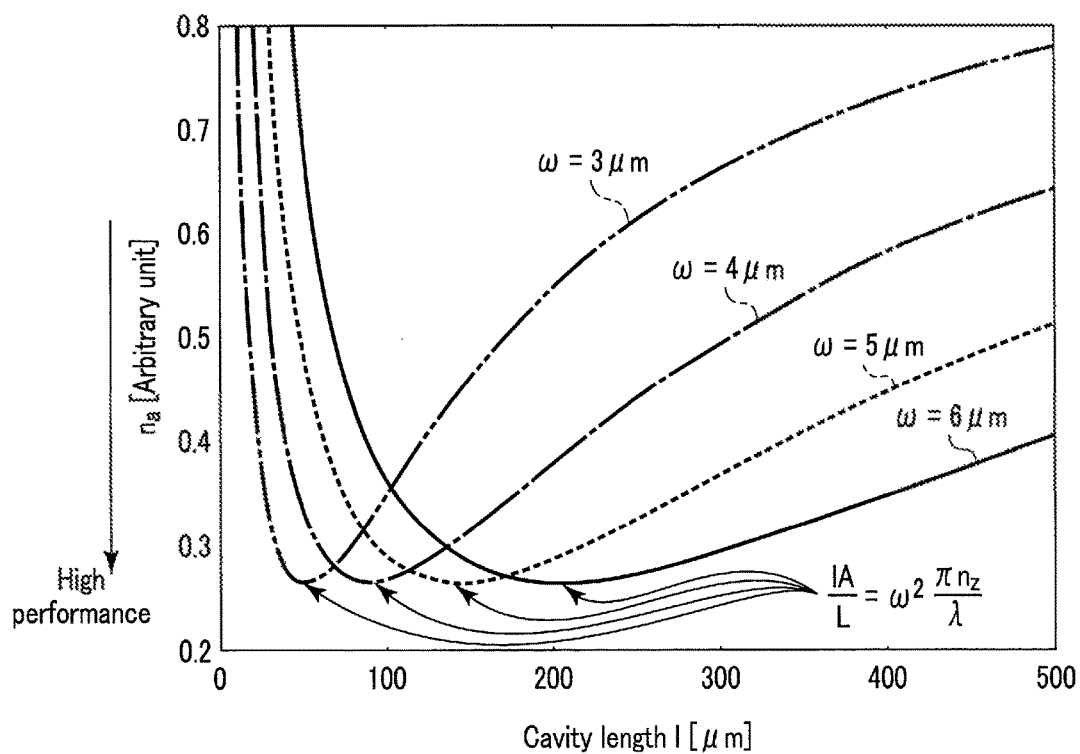
FIG. 4 is a diagram illustrating the range of design parameters for the cavity according to the first embodiment.

As is apparent from FIG. 4, when the cavity length ranges from the half of the optimal cavity length $l_0$ to the double of the optimal cavity length ($0.5l_0 \leq l \leq 2l_0$), the performance index $n_{ai}$ varies insignificantly, that is, the loss resulting from the inter-mode coupling, is effectively suppressed. Therefore, the cavity may be designed so as to satisfy $0.5l_0 \leq l \leq 2l_0$.

A condition is also examined under which the optimal computing element performance is achieved when the loss other than the mode coupling loss is proportional to the cavity length ($f(l)=BlL_0$), where B represents a loss per one reciprocation in the cavity proportional to the cavity length. In this case, $n_{ai}$ is expressed as follows.

$$n_{a1} = c_1 \frac{z_{1x}}{l} \left\{ L_0 \left[ l - \frac{n_z}{n_x} z_{1x} \arctan\left(\frac{l n_x}{z_{1x} n_z}\right) \right] \left(\frac{\omega_x}{z_{1x}}\right)^2 + BlL_0 \right\}$$

$$n_{a2} = c_2 \frac{z_{2y}}{l} \left\{ L_0 \left[ l - z_{2y} \arctan\left(\frac{l}{z_{2y}}\right) \right] \left(\frac{\omega_y}{z_{2y}}\right)^2 + BlL_0 \right\}$$

The expressions are differentiated to allow the cavity length to be expressed as follows.

$$\frac{Bl}{L} = \arctan\left(\frac{l}{l_R}\right) - \frac{l l_R}{l_R^2 + l^2}$$

In the expression, $l_R$ represents a Rayleigh length, $l_R = \omega^2 \pi n_x / \lambda$. This optimal structure corresponds to the minimum of the graph in FIG. 5. The optimal Rayleigh length is represented as $l_{R0}$. In this optimal structure, the loss resulting from the mode coupling is suppressed to allow $n_{ai}$ to take the minimum.

The effect of the inter-mode coupling is assumed to be significant to make $n_{ai}$ double the minimum. When the minimum of $n_{ai}$ is represented as $n_{ai\ min}$, the Rayleigh length $l_{R1}$ at which $n_{ai} = 2 n_{ai\ min}$ satisfies the following relation.

$$l_{R1} = l_{R0} + \delta$$

$$\delta = -\frac{(l^2 + l_{R0}^2)(2 + Bl_{R0}) \pm \sqrt{(l^2 + l_{R0}^2)^2 (2 + Bl_{R0})^2 - 4 l_{R0} l [B(l^2 + l_{R0}^2) + l_{R0}]}}{2[B(l^2 + l_{R0}^2) + l_{R0}]}$$

Therefore, in the structure that suppresses the loss resulting from the inter-mode coupling, the Rayleigh length $l_R$ may satisfy the following relation.

$$l_{R0} - \frac{(l^2 + l_{R0}^2)(2 + Bl_{R0}) - \sqrt{(l^2 + l_{R0}^2)^2 (2 + Bl_{R0})^2 - 4 l_{R0} l [B(l^2 + l_{R0}^2) + l_{R0}]}}{2[B(l^2 + l_{R0}^2) + l_{R0}]} < l_R < l_{R0} - \frac{(l^2 + l_{R0}^2)(2 + Bl_{R0}) + \sqrt{(l^2 + l_{R0}^2)^2 (2 + Bl_{R0})^2 - 4 l_{R0} l [B(l^2 + l_{R0}^2) + l_{R0}]}}{2[B(l^2 + l_{R0}^2) + l_{R0}]}$$

Even when the cavity length l ranges from the half of the optimal cavity length $l_0$ to the double of the optimal cavity length ($0.5l_0 \leq l \leq 2l_0$), the loss resulting from the inter-mode coupling is effectively suppressed. Therefore, the cavity may be designed so as to satisfy $0.5l_0 \leq l \leq 2l_0$.

Such a condition can be determined using a method similar to the above-described method even when the loss other than the mode coupling loss is expressed by a more general function. The above-described example is illustrative, and the condition for suppressing the loss of the cavity mode of the cavity attached to the birefringent crystal can be obtained by formulating the mode coupling loss using the above-described analysis technique for various cavities.

EXAMPLE 1

In Example 1, an example of the cavity will be described in which the loss other than the mode coupling loss is not dependent on the cavity length.

As depicted in FIG. 1, the cavity in Example 1 is a monolithic Fabry-Perot cavity including a $Y_2SiO_5$ crystal into which $Pr^{3+}$ ions are doped (Pr:YSO) as the birefringent crystal 11, the spherical mirror 12 arranged on the surface 14 of the $Y_2SiO_5$ crystal, and the plane mirror 13 arranged on the surface 15 of the $Y_2SiO_5$ crystal. The spherical mirror 12 and the plane mirror 13 are arranged such that the b axis of the crystal axes (b axis, $D_1$ axis, $D_2$ axis) of the $Y_2SiO_5$ crystal is parallel to the optical axis (z axis) of the cavity. The spherical mirror 12 and the plane mirror 13 are used such that the polarization direction (x-axis direction) of the cavity mode on the optical axis is parallel to the $D_2$-axis direction. When light is assumed to have a wavelength of 606 nm, a refractive index to light polarized in the $D_2$-axis direction is approximately 1.81, and a refractive index light polarized in the b-axis direction is approximately 1.79. The spherical mirror 12 is produced by polishing the surface 14 of the $Y_2SiO_5$ crystal so as to set the radius of curvature R to 2.000 mm and forming a dielectric multilayer film on the polished surface 14. The $Y_2SiO_5$ crystal is processed so as to set the cavity length to 0.173 mm. The plane mirror 13 is produced by forming a dielectric multilayer film on the surface 15 subjected to surface polishing. This results in a mode waist radius of 5 μm.

The thus processed cavity satisfies the condition for suppressing the mode coupling loss when, for example, the loss $AL_0$ on the spherical mirror 12 is approximately 0.01% and the loss $BlL_0$ in the birefringent crystal is negligible. The thus processed cavity also satisfies the condition for suppressing the mode coupling loss even when, for example, the loss $BlL_0$ in the birefringent crystal is approximately 0.01% and the loss $AL_0$ on the spherical mirror 12 is negligible. Therefore, the cavity according to Example 1 allows the mode coupling loss to be suppressed.

EXAMPLE 2

In Example 2, a quantum computer utilizing the cavity according to the first embodiment will be described.

FIG. 6 schematically illustrates the quantum computer according to Example 2. The quantum computer illustrated in FIG. 6 includes the cavity 10 depicted in FIG. 1. The cavity 10 includes a $Pr^{3+}:Y_2SiO_5$ crystal corresponding to the birefringent crystal 11. The cavity 10 is arranged in a cryostat 68 so as to be kept at low temperature (for example, 4K).

The quantum computer further includes a light source apparatus which generates operation light to manipulate physical systems used as qubits and which irradiates the physical systems with the operation light. The light source apparatus includes a semiconductor laser 60, a beam splitter 61, a mirror 62, acousto-optic modulators 63 and 64, mirrors 65 and 66, a lens 67, and a controller 69. Laser light output from the semiconductor laser 60 is split into two portions by the beam splitter 61. One of the laser light beams resulting from the splitting enters the acousto-optic modulator 63, while the other laser light beam is reflected by the mirror 62 to enter the acousto-optic modulator 64. The acousto-optic modulators 63 and 64 modulate the frequency and intensity of the laser light in accordance with control signals generated by the controller 69. The laser light beam modulated by the acousto-optic modulator 63 is guided by the mirrors 65, 66 and the lens 67 so as to be radiated to the cavity 10. The laser light beam modulated by the acousto-optic modulator 63 is guided by the lens 67 so as to be radiated to the cavity 10. The quantum computer can execute a quantum gate by selectively manipulating two qubits through irradiation with the two laser light beams.

The quantum computer according to Example 2 performs quantum gate operation using the cavity in which the cavity mode of the cavity efficiently couples to the physical systems included in the birefringent crystal. This enables an increase in the success probability of the quantum gate operation.

Second Embodiment

For a quantum computer which optically manipulates physical systems used as qubits and in which the physical systems resonate with the common cavity mode to interact with one another, a method is known which suppresses the adverse effect of an error in quantum gate operation on information processing when the error results from a particular cause. The error in quantum gate operation corresponds to a difference between an actual quantum state of the qubits resulting from quantum gate operation and a quantum state of the qubits that is expected to be established as a result of the quantum gate operation. For example, a conditioned quantum gate which varies the quantum state of one qubit according to the quantum state of another qubit or a quantum gate referred to as a two-quantum-bit gate is executed by adiabatic passage using operation light. At this time, a photon may be lost due to spontaneous emission from the physical systems used as the qubits, or a photon may be lost which are in a cavity mode needed to allow the physical systems used as the qubits to interact with each other. This results in such an error. The photon lost in this manner is referred to as a lost photon. In these cases, the quantum computer is configured to detect a lost photon while executing quantum gate operation for error correction, and adopts information processing results produced when no lost photon is detected. This allows efficient suppression of the adverse effect of the error on information processing.

In cases where the qubits are arranged in the solid medium, operation light may be scattered in the solid medium or at an interface between the outside and the solid medium. Then, scattered light which is more intense than the lost photon may reach a photodetector, making the scattered light resulting from the operation light difficult to distinguish from the lost photon. Therefore, the lost photon is precluded from being correctly detected. Thus, even if the lost photon is not actually lost, the information processing results may be discarded because of the scattered light. That is, the quantum gate operation may be considered to have failed.

In the second embodiment, a technique provided which allows, when the physical systems in the solid medium are utilized as qubits, a lost photon to be correctly detected while avoiding the adverse effect of scattering of the operation light allowing the qubits to be manipulated.

Figure 7A:
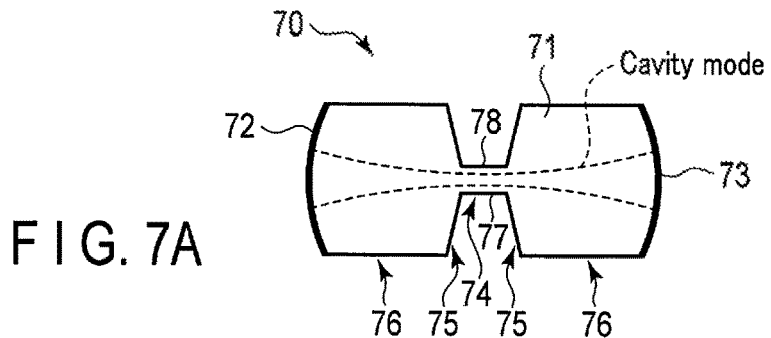
FIGS. 7A and 7B are a top view and a front view, respectively, depicting an example of a cavity according to a second embodiment.
Figure 7B:
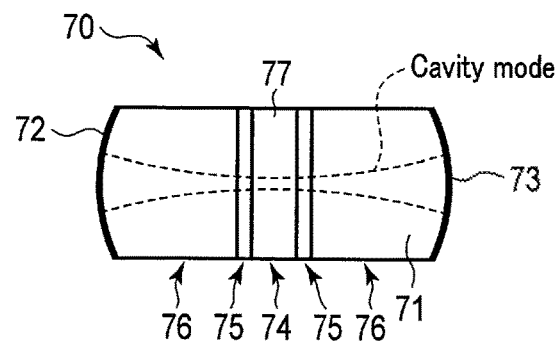

FIGS. 7A and 7B are a top view and a front view, respectively, schematically depicting a cavity 70 in one example used for a quantum computer according to the second embodiment. As depicted in FIGS. 7A and 7B, the cavity 70 includes a solid medium 71, a spherical mirror 72 attached to the solid medium 71, and a spherical mirror 73 attached to the solid medium 71 opposite to the spherical mirror 72. The solid medium 71 includes therein physical systems which resonate with the common cavity mode of the cavity 70. The solid medium 71 has parts different in thickness in a traveling direction of operation light used to manipulate the physical systems used as qubits. The thickness hereinafter refers to the thickness in the traveling direction of the operation light unless otherwise specified. In FIG. 7A, the operation light travels from an incident surface 77 to an emitting surface 78. The solid medium 71 has a thin part 74, thick parts 76 adjacent to the spherical mirrors 72 and 73, respectively, and parts 75 each extending in a tapered manner between the part 74 and the part 76. The physical systems positioned in the part 74 are utilized as qubits. A part of the surface of the part 74 is irradiated with the operation light. The part 74 is hereinafter referred to as the irradiated part. The operation light is emitted from such a light source apparatus as depicted in FIG. 6.

The physical systems used as the qubits resonate with the common cavity mode and perform an interaction needed for the two-quantum-bit gate, via a photon present in the cavity mode. The solid medium 71 is partly thinned to the extent that the effect on the lifetime of the photon of the cavity mode is prevented from hindering execution of the two-quantum-bit gate.

The total amount of scattered light generated inside the solid medium 71 by the operation light is substantially proportional to the length of an optical path of the operation light inside the solid medium 71 when the solid medium 71 is a common uniform transparent medium and the total amount of scattered light corresponds to a very small portion of the incident light (for example, 10% or less). The solid medium 71 may be such a transparent medium. The solid medium 71 is formed to make the irradiated part 74 thinner than the neighbor parts 75 and 76 so as to set a short optical path of the operation light inside the solid medium 71. This enables a reduction in possible scattered light.

Figure 8A:
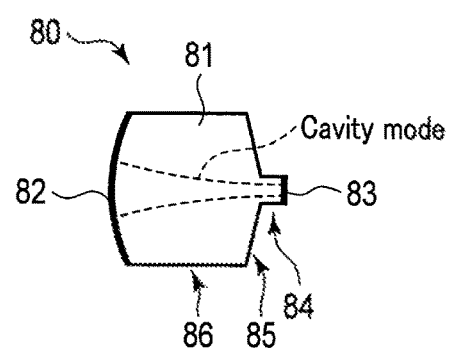
FIGS. 8A and 8B are a top view and a front view, respectively, depicting another example of the cavity according to the second embodiment.
Figure 8B:
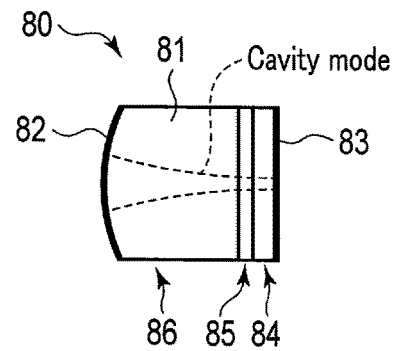

FIGS. 8A and 8B are a top view and a front view, respectively, schematically depicting a cavity 80 in another example used for a quantum computer according to the second embodiment. As depicted in FIGS. 8A and 8B, the cavity 80 includes a solid medium 81, a spherical mirror 82 attached to the solid medium 81, and a plane mirror 83 attached to the solid medium 81 opposite to the spherical mirror 82. The solid medium 81 includes therein physical systems which resonate with the common cavity mode of the cavity 80. The solid medium 81 has a thin irradiated part 84 adjacent to the plane mirror 83, a thick part 86 adjacent to the spherical mirror 82, and a part 85 extending in a tapered manner between the part 84 and the part 86.

Figure 9A:
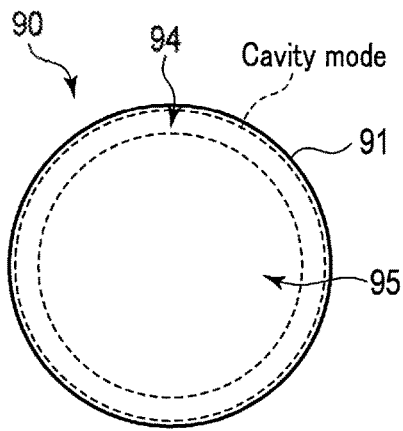
FIGS. 9A and 9B are a top view and a front view, respectively, depicting yet another example of the cavity according to the second embodiment.
Figure 9B:
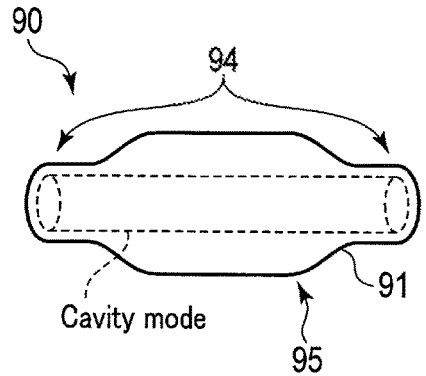

FIGS. 9A and 9B are a top view and a front view, respectively, schematically depicting a cavity 90 in another example used for a quantum computer according to the second embodiment. The cavity 90 depicted in FIGS. 9A and 9B is toroidal or disc-shaped cavity having a cavity mode referred to as a whispering gallery mode. The cavity 90 includes a disc-shaped solid medium 91. A tapered optical fiber (not depicted in the drawings) for light input and output is connected to the solid medium 91. The solid medium 91 includes therein physical systems which resonate with the common cavity mode of the cavity 90. The cavity mode is present inside the solid medium 91 along a periphery of the solid medium 91. The solid medium 91 includes a thin irradiated part 94 extending along the periphery and a thick part 95 positioned inside the irradiated part 94.

Figure 10:
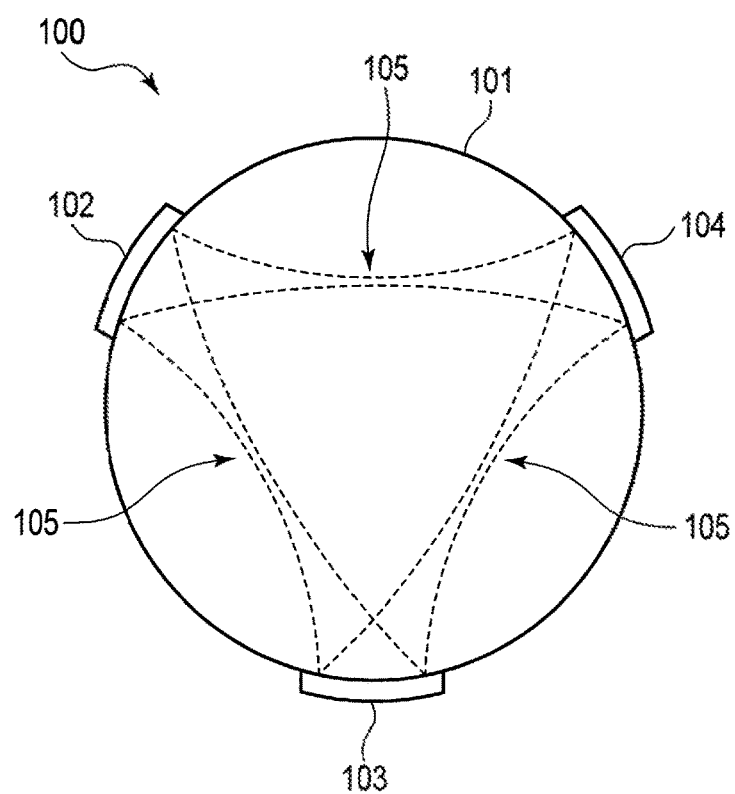
FIG. 10 is a top view depicting another example of the cavity according to the second embodiment.

FIG. 10 is a top view schematically depicting a cavity 100 in another example used for a quantum computer according to the second embodiment. As depicted in FIG. 10, the cavity 100 includes a solid medium 101 and spherical mirrors 102, 103 and 104 attached to the solid medium 101. The solid medium 101 includes therein physical systems which resonate with the common cavity mode of the cavity 100. The cavity mode is present between the spherical mirror 102 and the spherical mirror 103, between the spherical mirror 103 and the spherical mirror 104, and between the spherical mirror 102 and the spherical mirror 104. The irradiated part 105 of the solid medium 101 is formed to be thinner than other neighbor parts.

The cavity 80 depicted in FIGS. 8A and 8B, the cavity depicted in FIGS. 9A and 9B, and the cavity 100 depicted in FIG. 10 are each shaped to set a short optic path of the operation light inside the solid medium, like the cavity 70 depicted in FIGS. 7A and 7B. This enables a reduction in possible scattered light.

As described below, additional scattered light may be generated. In the cavity 70 depicted in FIG. 7, the operation light enters the solid medium 71 through the incident surface 77, passes through the solid medium 71, and exits the solid medium 71 through the emitting surface 78. At this time, a portion of the operation light is reflected by the emitting surface 78 and passes through the solid medium 71 again. In this case, the reflected light from the emitting surface 78 may cause the generation of additional scattered light inside the solid medium 71. When the reflected light reaches the incident surface 77, most of the reflected light exits the solid medium 71 through the incident surface 77, while a portion of the reflected light is reflected by the incident surface 77 and passes through the solid medium 71 again. The reflected light from the incident surface 77 may cause the generation of additional scattered light inside the solid medium 71. Furthermore, the operation light having exited through the emitting surface 73 may, for example, be reflected by any object and enter the solid medium 71 again. The operation light having entered the solid medium 71 may cause the generation of additional scattered light inside the solid medium 71 again. A mechanism will be described which prevents additional scattered light from being generated as described above.

Figure 11A:
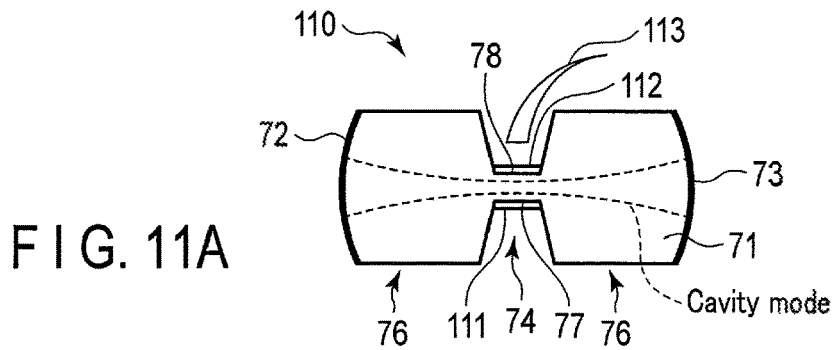
FIGS. 11A and 11B are a top view and a front view, respectively, depicting still another example of the cavity according to the second embodiment.
Figure 11B:
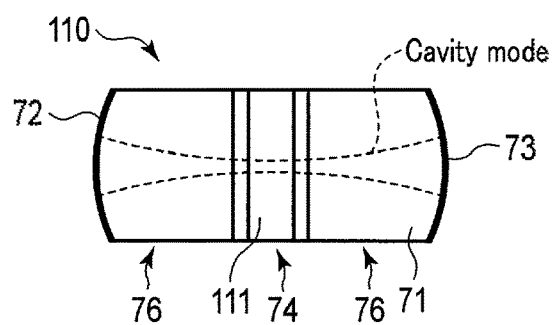

FIGS. 11A and 11B are a top view and a front view, respectively, schematically depicting a cavity 110 in another example used for a quantum computer according to the second embodiment. As depicted in FIGS. 11A and 11B, the cavity 110 includes the solid medium 71, the spherical mirrors 72 and 73 attached to the solid medium 71 opposite to each other, an anti-reflective coating 111 applied to the incident surface 77 of the irradiated part 74, an anti-reflective coating 112 applied to the emitting surface 78 of the irradiated part 74, and an optical trap 113 provided opposite to the anti-reflective coating 112. The optical trap 113 is installed beyond the anti-reflective coating 112 in the traveling direction of the operation light. The solid medium 71 is not limited to the example where the irradiated part 74 is shaped to be thinner than the neighbor parts 75 and 76 as depicted in FIG. 11A but may be configured such that the irradiated part 74 has the same thickness as that of the other parts 75 and 76, for example, as in the cavity 10 depicted in FIG. 2.

The anti-reflective coatings 111 and 112 prevent internal reflection. Specifically, the anti-reflective coating 112 prevents the operation light traveling through the solid medium 71 from being reflected by the emitting surface 78. The provision of the anti-reflective coating 112 reduces the operation light reflected by the emitting surface 78. The anti-reflective coating 111 prevents the operation light traveling through the solid medium 71 after being reflected by the emitting surface 78 from being reflected by the incident surface 77. The provision of the anti-reflective coating 111 reduces the operation light reflected by the incident surface 77.

In the example illustrated in FIGS. 11A and 11B, the anti-reflective coating is applied both to the incident surface 77 and to the emitting surface 78. However, the areas to which the anti-reflective coating is applied are not limited to the areas in this example. For example, the anti-reflective coating may be applied to at least one of the incident surface 77 and the emitting surface 78. Preferably, the anti-reflective coating may be applied to the emitting surface 78. The anti-reflective coating may be applied to areas other than the incident surface 77 and the emitting surface 78.

The optical trap 113 traps the operation light transmitted through the solid medium 71. The provision of the optical trap 113 prevents the operation light transmitted through the solid medium 71 from entering the solid medium 71 again. Instead of the optical trap 113, an optical absorber may be used.

The anti-reflective coating and the optical trap 113 or the optical absorber may be applied to other cavities such as the cavity 80 depicted in FIGS. 8A and 8B, the cavity 90 depicted in FIGS. 9A and 9B, and the cavity 100 depicted in FIG. 10.

As described above, the anti-reflective coatings 111, 112, and the optical trap 113 prevent multiple reflections of the operation light inside the solid medium 71 and causing the generation of scattered light. The anti-reflective coatings 111, 112, and the optical trap 113 further prevent the operation light having temporarily exited the solid medium 71 from being returned into the solid medium 71 and causing the generation of scattered light, and also prevent the operation light having exited the solid medium 71 from reaching a certain scatterer and thus causing the generation of scattered light. As a result, the scattered light can be prevented from reaching the photodetector which detects a lost photon. Moreover, upon reaching the incident surface 77 or the emitting surface 78, the scattered light generated in the solid medium 71 can be prevented from returning into the solid medium 71 after being reflected by the incident surface 77 or the emitting surface 78.

Figure 12A:
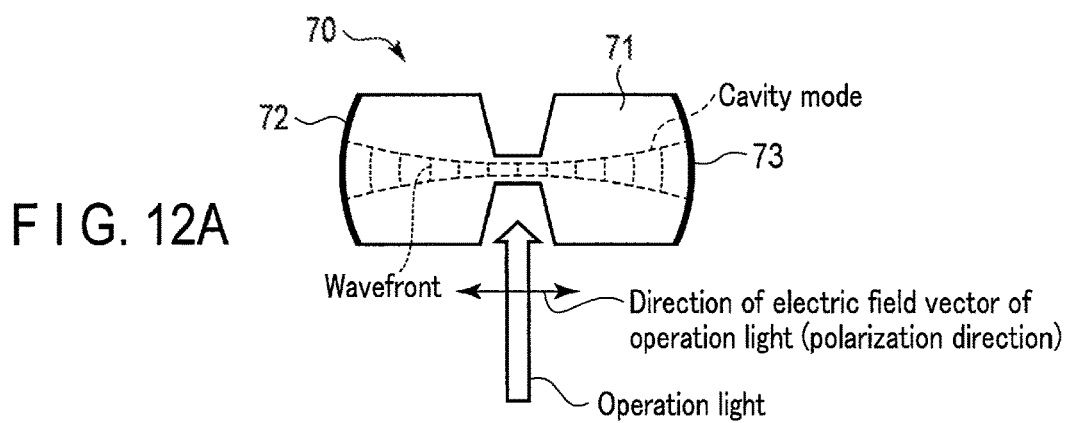
FIGS. 12A and 12B are a top view and a front view, respectively, illustrating a relation between a polarization direction of operation light and a wavefront of a cavity mode according to the second embodiment.
Figure 12B:
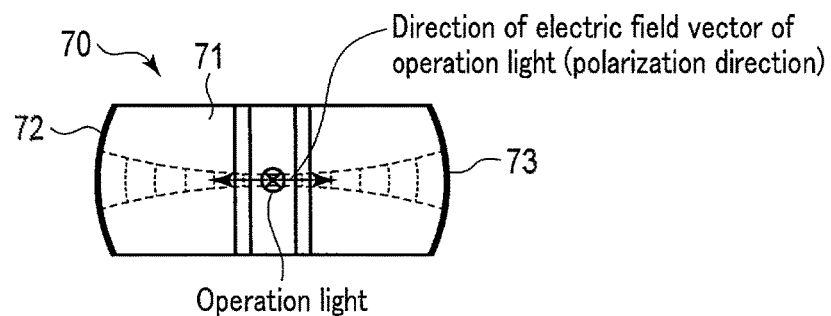
Figure 13A:
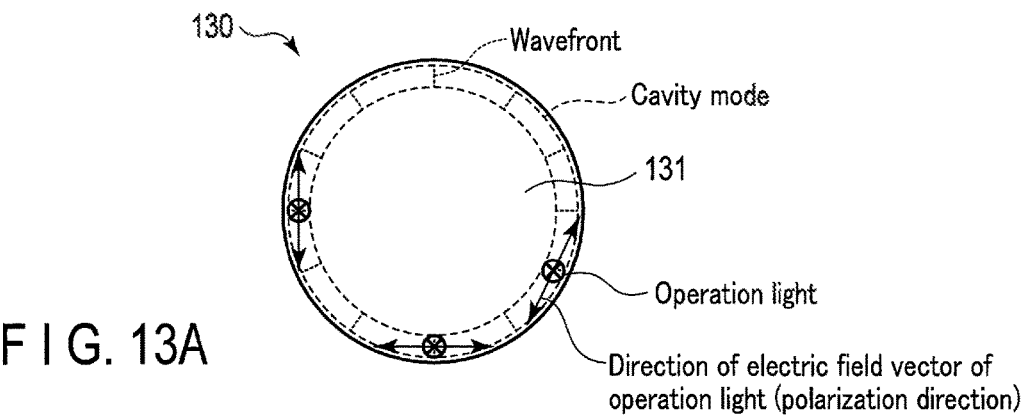
FIGS. 13A and 13B are a top view and a front view, respectively, illustrating the relation between the polarization direction of the operation light and the wavefront of the cavity mode according to the second embodiment.
Figure 13B:
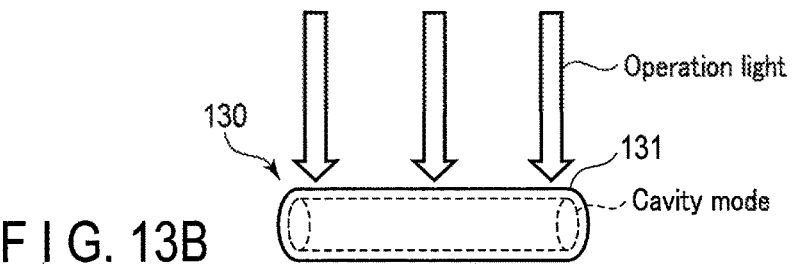

In the present embodiment, the polarization direction of the operation light can be set to coincide with a direction which crosses (for example, is orthogonal to) the wavefront of the cavity mode. The polarization direction points to the direction of an electric field vector of light. FIGS. 12A and 12B depict the Fabry-Perot cavity 70 depicted in FIGS. 7A and 7B and in which the polarization direction of the operation light is set to coincide with a direction orthogonal to the wavefront of the cavity mode. FIGS. 13A and 13B depict a cavity 130 which is similar to the cavity 90 depicted in FIGS. 9A and 9B and in which the polarization direction of the operation light is set to coincide with a direction orthogonal to the wavefront of the cavity mode. In a solid medium 131 in the cavity 130, the irradiated part has the same thickness as that of the neighbor parts. When the polarization direction of the operation light is orthogonal to the wavefront of the cavity mode, scattered light is less likely to be generated in the direction orthogonal to the wavefront of the cavity mode. The reason will be described below.

A lost photon is assumed to be lost mostly through an input/output element for light in the cavity mode and light outside of the cavity. For example, for the Fabry-Perot cavity, a lost photon is lost through the mirror (for example, the spherical mirror 72 or the spherical mirror 73) included in the cavity. For the toroidal or disc-shaped cavity, a lost photon is lost through the tapered optical fiber for input and output. In these cases, a spatial mode (the area where the lost photon is present and the direction in which the lost photon travels) outside the cavity mode for the lost photon traveling from the cavity mode to the outside of the solid medium is evidently known, and a photodetector or a photon detector is arranged in association with the spatial mode. That is, the photodetector or the photon detector is considered to be arranged near the mirror included in the cavity, or at an end surface of the I/O tapered optical fiber. At this time, when the polarization direction of the operation light is set to be orthogonal to the wavefront of the cavity mode, it is possible to significantly reduce the possibility that the photodetector is reached by a photon that is not the lost photon, that is, scattered light generated by the effect of the operation light.

Next, the reason why scattered light is less likely to be generated in the direction orthogonal to the wavefront of the cavity mode when the polarization direction of the operation light is orthogonal to the wavefront of the cavity mode will be explained.

Figure 14:
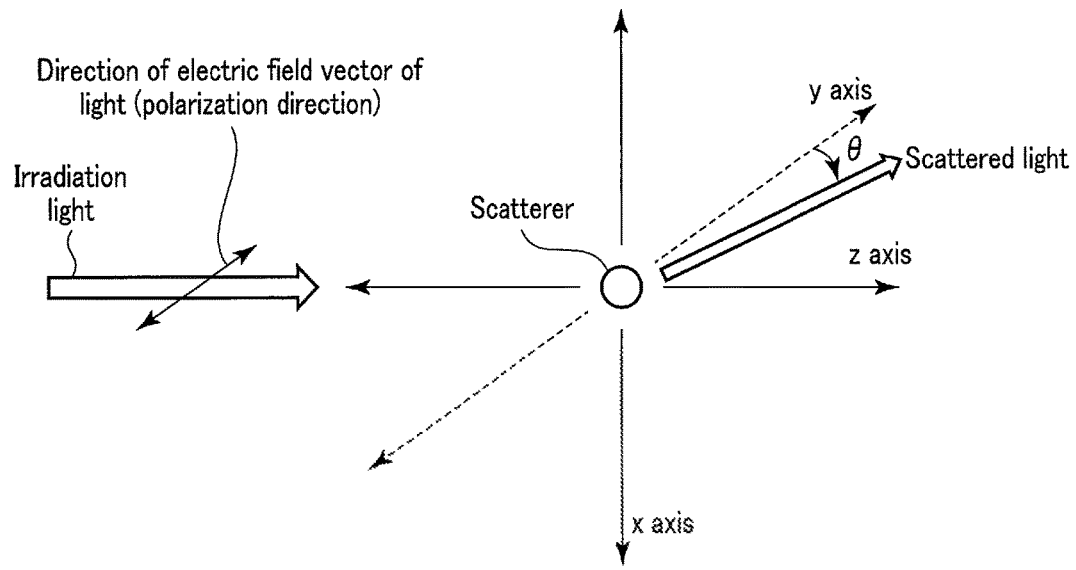
FIG. 14 is a diagram illustrating a directional dependency of scattered light intensity.

When the scatterer is irradiated with light to generate scattered light, an intensity distribution of the scattered light depends significantly on the traveling direction and polarization direction of irradiation light. The dependency will be described with reference to FIG. 14. As illustrated in FIG. 14, the irradiation light traveling in the z-axis direction is assumed to have an electric field vector oscillating in the y-axis direction. When the irradiation light is scattered into scattered light by the scatterer, the direction of a dipole moment induced by the scatterer is also the y-axis direction. Electromagnetic waves radiated from the dipole moment are scattered light. The intensity of the scattered light in a far field is high for scattered light traveling in the z-axis direction and in the x-axis direction, and is low for scattered light traveling in the y axis direction. When the angle between the y-axis direction and a direction from the scatterer toward an observation point where the intensity of scattered light is observed is represented as θ, the intensity (power) per unit solid angle is proportional to $\sin^2 \theta$. Therefore, when the polarization direction of the operation light is orthogonal to the wavefront of the cavity mode, scattered light is less likely to be generated in the direction orthogonal to the wave front of the cavity mode.

As described above, the provision of the anti-reflective coating in the irradiated part allows the scattered light generated in the solid medium to exit the solid medium without being reflected at the interface between the solid medium and the outside. When the polarization direction of the operation light is set to coincide with the direction orthogonal to the wavefront of the cavity mode, the direction in which the intensity of the scattered light exiting the solid medium increases is mostly limited to an in-plane direction of the wavefront of the cavity mode including an operation light irradiated spot of the solid medium. Thus, the anti-reflective coating is applied to the irradiated part, and the polarization direction of the operation light is set to coincide with the direction orthogonal to the wavefront of the cavity mode. Therefore, even if the lost photon is lost from an element other than the input/output element for the light in the cavity mode and the light outside of the cavity, for example, even if the lost photon is lost from the cavity mode or due to spontaneous emission from the physical systems used as the qubits, the present embodiment enables the arrangement of the photodetector to be selected to allow the lost photon to be more accurately detected while avoiding the adverse effect of the scattered light generated as a result of scattering of the operation light by the solid medium.

As described above, the present embodiment adopts at least one of (1) forming the irradiated part of the solid medium to be thinner than the other neighbor parts, (2) the provision of the anti-reflective coating and the optical trap or the light absorber, and (3) the setting of the polarization direction of the operation light to coincide with the direction intersecting the wavefront of the cavity mode. The present embodiment thus allows the lost photon to be correctly detected while avoiding the adverse effect of scattering of the operation light allowing the qubits to be manipulated.

EXAMPLE 3

A quantum computer according to Example 3 uses, as a qubit, quantum states of nuclear spin of $Pr^{3+}$ ions in the $Y_2SiO_5$ crystal.

Figure 15A:
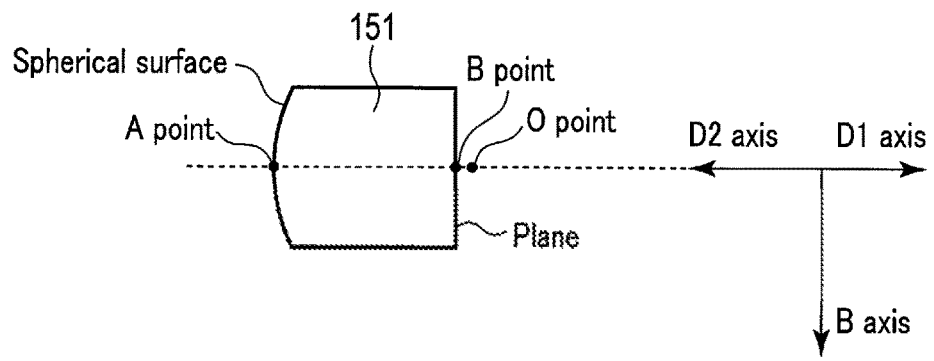
FIGS. 15A and 15B are diagrams illustrating the orientations of crystal axes of a solid medium in a cavity according to Example 3.
Figure 15B:
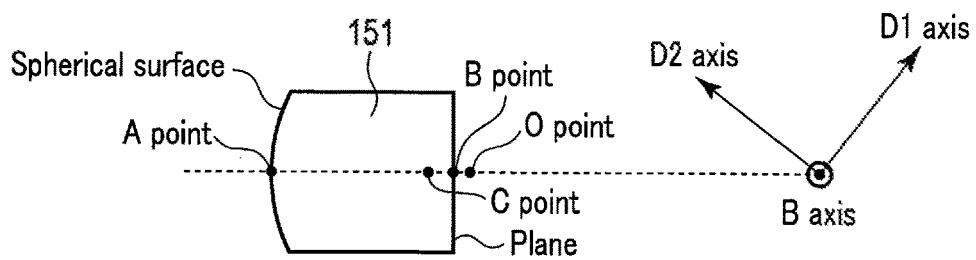

A solid medium 151 including qubits as depicted in FIGS. 15A and 15B is prepared as follows. A cube is produced which is 3 mm on a side and which is formed of a $Pr^{3+}:Y_2SiO_5$ crystal with $10^{-6}$% of $Y^{3+}$ ions in the $Y_2SiO_5$ crystal substituted with $Pr^{3+}$ ions. One face of the cube is processed into a spherical surface which is tangent to the center of the face and which has a radius of curvature of 3.3 mm. At this time, the direction of the crystal axis of the $Pr^{3+}:Y_2SiO_5$ is set as follows. A B axis of the crystal is set to coincide with a direction which is orthogonal to a line connecting the center (designated as an O point) of the spherical surface and the center (designated as a B point) of a plane opposite to the spherical surface and which is orthogonal to one of four planes connected to the spherical surface. A D2 axis is set not to fee parallel to the line connecting the O point and the B point together and not to be orthogonal to the line connecting the O point and the B point together.

Figure 16:
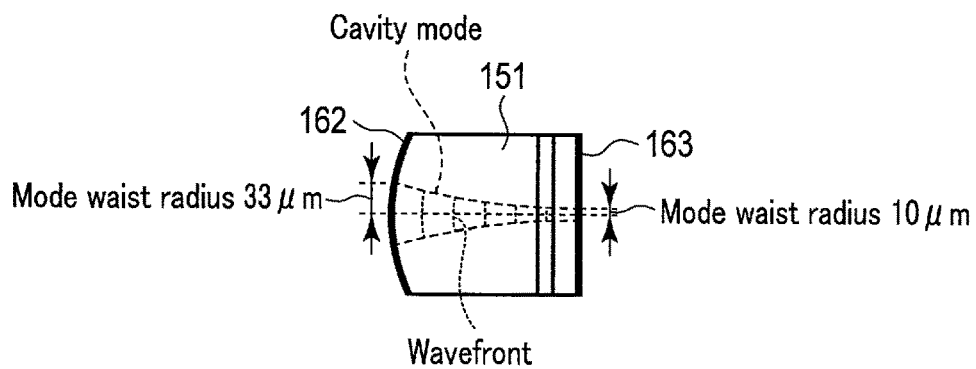
FIG. 16 is a diagram illustrating the size of a mode generated in the solid medium depicted in FIGS. 15A and 15B.

As depicted in FIG. 16, when dielectric multilayer mirrors 162 and 163 are formed on the spherical surface of the solid medium 151, a cavity mode is generated in the solid medium 151. An intersection point between a line connecting the O point and the B point together and the spherical surface formed on the crystal is designated as an A point. To introduce interactions between the physical systems ($Pr^{3+}$ ions) used as qubits, a cavity mode near 494.7 THz is utilized that is included in $TEM_{00}$ modes generated along a line AB connecting the A point and the B point together, and which resonates with a $^3H_4$-$^1D_2$ transition of $Pr^+$ ions. This cavity mode has a mode waist at the B point, and a mode waist radius (mode radius) is approximately 10 μm. Near the mode waist, the wavefront of the mode is substantially planar. At the A point, the mode radius has a maximum value of 33 μm.

The magnitude (coupling constant) of the interaction between the cavity mode and the $Pr^{3+}$ ions increases with decreasing distance to the line AB and with decreasing mode: radius. Therefore, ions near the B point are used as qubits. In the present example, an end surface of the solid medium 151 and the dielectric multilayer mirror 163 are located at the position of the mode waist. To avoid scattering of the operation light by the end surface of the solid medium 151 or the dielectric multilayer mirror 163, ions at a C point that is approximately 500 μm closer to the A point than the B point are used as qubits. In the present example, a mode waist radius of 10 µm is sufficiently larger than the wavelength of the cavity mode (approximately 606 nm, which corresponds to 494.7 THz). Thus, the mode has a small spread angle toward the A point, and thus, even at the C point, a coupling constant substantially similar to the coupling constant at the B point is acquired. Therefore, the operation light utilized to manipulate the qubits is radiated to the C point in a focusing manner such that the diameter of the operation light is approximately 10 µm. This allows the ions present at the C point to be used as qubits.

A surface of the solid medium 151 opposite to the spherical surface is also processed into a spherical surface to allow a mode waist to be created inside the solid medium 151. For example, the length (cavity length) between the A point and the B point in the solid medium 151 in the present example is set to 6 mm, a plane at the B point is also processed into a spherical surface that is tangent to the plane at a central point of the plane, and both spherical surfaces are set to have a radius of curvature of 3.3 mm. Then, a mode waist is generated at a middle point of a segment connecting the A point and the B point together. In that case, the middle point is irradiated with the operation light, and ions present at the middle point are used as qubits.

Figure 17:
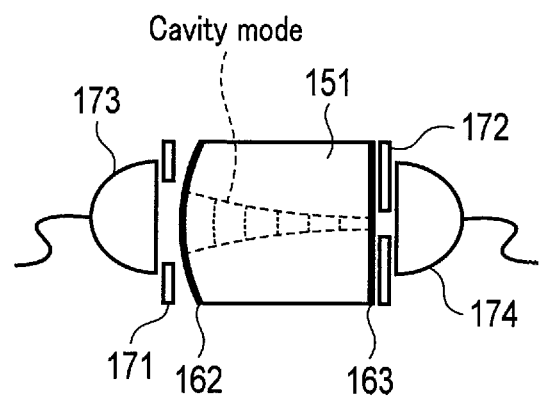
FIG. 17 is a diagram depicting a quantum computer according to a comparative example related to Example 3.

When the solid medium 151 is a single crystal that is substantially transparent to the operation light and surfaces at which mirrors are to be provided is sufficiently accurately polished, a main process, in which a photon needed for the interaction between the $Pr^{3+}$ ions used as qubits is lost from the solid medium 151 in the present example, is considered to be a process in which a photon exit the solid medium 151 through the mirror 162 or 163. To allow detection of a lost photon that are lost during the process, a pinhole 171 with a radius of 100 µm and a photodetector 173 are arranged near the A point, and a pinhole 172 with a radius of 30 µm and a photodetector 174 are arranged near the B point, as depicted in FIG. 17.

In this state, first, operation light of approximately 100 µW is radiated which has an electric field vector orthogonal to the line AB and parallel to the incident surface. The total of light intensities detected by the two photodetectors 173 and 174 is recorded as $I_1$.

Then, a cavity is prepared by processing a quadratic prism so as to cut away opposite sides of a 100 µm×3 mm rectangle (long sides of the rectangle are parallel to the above-described incident surface) which shares the center of a square surface opposite to the spherical surface of the solid medium 151, with the rectangle left to serve as a mirror. As depicted FIG. 19, the pinhole 171 with a radius of 100 µm and the photodetector 173 are arranged near the A point, and the pinhole 172 with a radius of 30 µm and the photodetector 174 are arranged near the B point. As is the case with the above-described structure, the C point is irradiated with operation light, and the total of light intensities detected by the two photodetectors 173 and 174 is recorded as $I_2$.

The ratio between $I_1$ and $I_2$ is expressed as follows mainly due to a difference in optical path length of the operation light traveling through the solid medium 151 while generating scattered light.

$$\frac{I_2}{I_1} = \int_0^{0.05} \left\{ S \times \frac{2.5}{\sqrt{x^2 + 2.5^2}} + \frac{9S}{100} \times \frac{0.5}{\sqrt{x^2 + 0.5^2}} \right\} dx /$$

$$\int_0^{1.5} \left\{ S \times \frac{2.5}{x^2 + 2.5^2} + \frac{9S}{100} \times \frac{0.5}{x^2 + 0.5^2} \right\} dx$$

$$\approx 3.6 \times 10^{-2}$$

Figure 18:
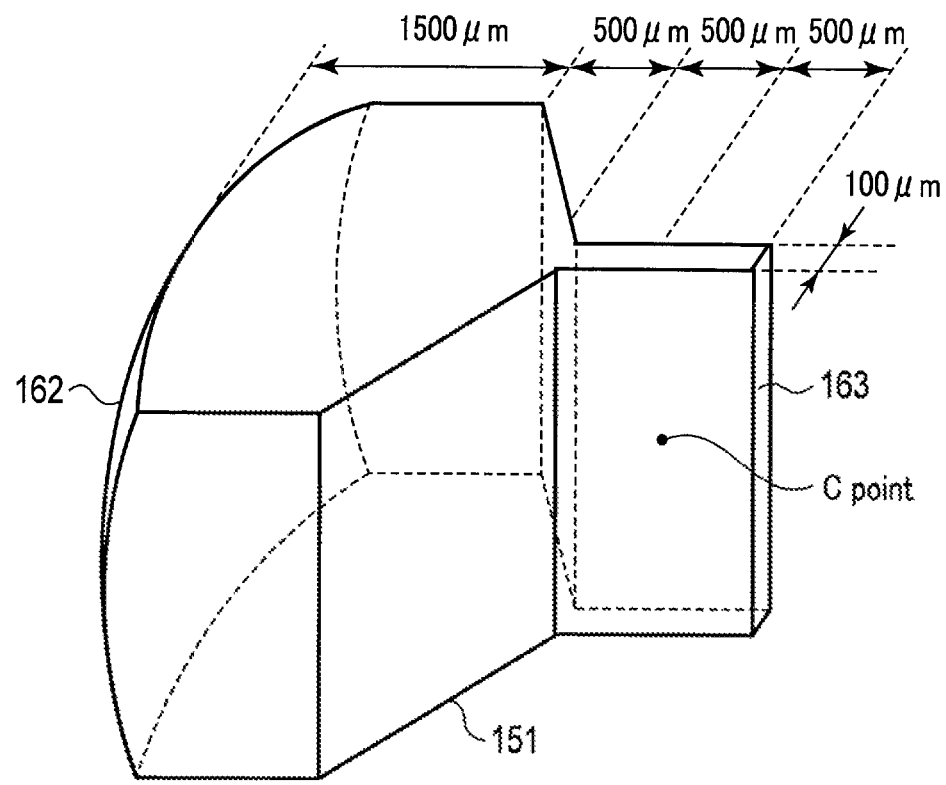
FIG. 18 is a perspective view depicting a cavity according to Example 3.

In the expression, S denotes the opening area of the pinhole 151 near the A point is denoted as. The use of the cavity depicted in FIG. 18 reduces photons of the scattered light reaching the photodetectors 173 and 174 to approximately one-thirtieth. That is, the quantum computer according to the present example (FIG. 19) includes the solid medium 151, which is thinner at the irradiated part than at the other parts near the irradiated part, thus enabling a reduction in the adverse effect of the scattered light resulting from scattering of the operation light by the solid medium and preventing accurate detection of a lost photon.

EXAMPLE 4

A quantum computer according to Example 4 is similar to the quantum computer in Example 3 except that an anti-reflective coating is applied to an operation light incident surface and an operation light emitting surface of the solid medium 151. The coating reduces the probability that the operation light is reflected by the emitting surface and enters the solid medium 151 again to generate scattered light or repeatedly reflected between the incident surface and the emitting surface to generate scattered light in the solid medium or that scattered light generated in the solid medium 151 reaches the emitting surface or the incident surface and is then reflected by the surface to return into the solid medium 151. Thus, compared to Example 3, the present example enables a further reduction in photons of the scattered light reaching the photodetectors.

In the present example, an optical trap is provided which receives the operation light exiting through the emitting surface. The optical trap reduces the adverse effect of the operation light exiting through the emitting surface and impinging on an object or being scattered by air or particulates in the air before reaching the photodetectors, thus preventing accurate detection of a lost photon. The provision of the optical trap is also effective in Example 3 and in Example 5 described below.

As described above, in the quantum computer according to the present example, the anti-reflective coating is applied to the operation light incident surface and operation light emitting surface of the solid material, and the optical trap or a light absorber is provided beyond the emitting surface. This enables a reduction in the adverse effect of scattered light resulting from scattering of the operation light by the solid medium or a substance outside the solid medium and preventing accurate detection of a lost photon.

EXAMPLE 5

In Example 5, in a quantum computer similar to the quantum computer in Example 4, the polarization direction of the operation light is set to coincide with the direction of the line AB, that is, to be orthogonal to the wavefront of the cavity mode. In this case, the angle between the traveling direction of scattered light reaching the photodetectors and the polarization direction of the operation light is denoted as $\theta_1$ for the photodetector 173 at the A point, and as $\theta_2$ for the photodetector 174 at the B point. Then, the following are given.

$$\sin^2\theta_1 < \frac{(0.1 + 0.05)^2}{2.5^2 + (0.1 + 0.05)^2} \cong 3.6 \times 10^{-3}$$

$$\sin^2\theta_2 < \frac{(0.05 + 0.03)^2}{0.5^2 + (0.05 + 0.03)^2} \cong 2.4 \times 10^{-2}$$

In the polarization of the operation light in Example 3 and Example 4, the following hold true.

$$\sin^2\theta_1 \approx 1$$

$$\sin^2\theta_2 \approx 1$$

When the angle between the polarization direction of the operation light and a direction from a scatterer toward an observation point where the intensity of the scattered light resulting from scattering of the operation light is observed is denoted as θ, the intensity of the scattered light is proportional to $\sin^2\theta$. Therefore, the present example sets the polarization direction of the operation light as described above to allow photons of the scattered light reaching the photodetectors to be further reduced to approximately 1/100 to 1/1000 relative to Example 3.

Scattering caused by the operation light inside the solid medium 151 in the present example is considered to be comparable to scattering of light with a wavelength of 700 nm by quarts in optical fibers. The quarts in the optical fibers causes a scattering loss of approximately 3 dB/km. Therefore, the following expression expresses a total scattered light intensity (scattering loss) resulting from traveling of incident light with an intensity $I_{in}$ through a 1-km solid medium 151:

$$I_{in} \times \left(1 - 10^{-\frac{3}{10}l}\right).$$

In the present example, in the irradiated part, the solid medium 151 has a thickness of 100 μm in the traveling direction of the operation light. Thus, the total scattered light resulting from scattering of 100 μW operation light is expressed as follows:

$$100 \times 10^{-6} \times \left(1 - 10^{-\frac{3}{10} \times 10^{-2}}\right) \cong 6.91 \times 10^{-12} \text{ (W)}.$$

In this case, if the polarization direction of the operation light is orthogonal to the line AB, the intensity I of scattered light reaching the two photodetectors 173, 174 is expressed as follows.

$$I < 6.91 \times 10^{-12} \times \left(\frac{0.1 \times 2}{2.5 \times 2 \times \pi} + \frac{0.03 \times 2}{0.5 \times 2 \times \pi}\right) \cong 2 \times 10^{-13} \text{ (W)}$$

Thus, when the polarization direction of the operation light is parallel to the line AB, the intensity of the scattered light reaching the two photodetectors 173 and 174 can be made lower than $10^{-15}$ W, which is 1/100 to 1/1000 of the intensity I in the expression.

For example, when a two-quantum-bit gate is executed at 100 μs, since a lost photon has an energy of approximately $4 \times 10^{-19}$ J, it is necessary to accurately detect light of $4 \times 10^{-19}$ J/100 μs=$4 \times 10^{-15}$ W, which corresponds to a lost photon intensity in the case of a loss of one photon for one gate, in order to achieve detection of a lost photon for this quantum gate. The present example allows the intensity of scattered light resulting from scattering of the operation light and reaching the photodetector to be reduced to $10^{-15}$ W or less, enabling a lost photon to be accurately detected.

Example 3, Example 4, and Example 5 assume that multiple scattering is negligibly small in magnitude in which intense operation light causes generation of scattered light that is further scattered in the solid medium. However, even with multiple scattering taken into account, the technique described in the second embodiment is effective. Furthermore, in Example 3, Example 4, and Example 5, even when scattering at the interface between the solid medium and the outside is taken into account, the technique, described in the second embodiment is effective.

Preferred aspects of the second embodiment will be described below.

[1] A quantum computer according to a first aspect includes:

a cavity including a solid medium including physical systems used as qubits, the cavity having a cavity mode which resonates with the physical systems;

a light source unit which irradiates the physical systems with operation light having a polarization direction crossing a wavefront of the cavity mode when the physical systems are coupled to each other by the cavity mode; and a detector which detects a photon lost from the physical systems or from the cavity mode.

[2]: In the quantum computer set forth in [1], the solid medium includes a first part where the physical systems are arranged and a second part different from the first part, the first part being smaller than the second part in a thickness in a traveling direction of the operation light.

[3]: The quantum computer set forth in [1] or [2] further includes a first anti-reflective coating applied to a first surface of the solid medium on which the operation light is incident, a second anti-reflective coating applied to a second surface of the solid medium through which the operation light exits, and an optical trap or a light absorber arranged opposite to the second anti-reflective coating.

[4]: A quantum computer according to a second aspect includes:

a cavity including a solid medium including a first part where physical systems used as qubits are arranged and a second part different from the first part, the cavity having a cavity mode which resonates with the physical systems, the first part being smaller than the second part in a thickness in a traveling direction of operation light to manipulate the physical systems;

a light source unit which irradiates the physical systems with the operation light when the physical systems are coupled to each other by the cavity mode; and a detector which detects a photon lost from the physical systems or from the cavity mode.

[5]: The quantum computer set forth in [4] further includes a first anti-reflective coating applied to a first surface of the solid medium on which the operation light is incident, a second anti-reflective coating applied to a second surface of the solid medium through which the operation light exits, and an optical trap or a light absorber arranged opposite to the second anti-reflective coating.

[6]: A quantum computer according to a third aspect includes:

a cavity including a solid medium including physical systems used as qubits, the cavity having a cavity mode which resonates with the physical systems, the cavity further including a first anti-reflective coating applied to a first surface of the solid medium on which operation light to manipulate the physical systems is incident, a second anti-reflective coating applied to a second surface of the solid medium through which the operation light exits;

an optical trap or a light absorber arranged opposite to the second anti-reflective coating;

a light source unit which irradiates the physical systems with the operation light when the physical systems are coupled to each other by the cavity mode; and a detector which detects a photon lost from the physical systems or from the cavity mode.

[7]: A quantum calculation method according to a fourth aspect includes:

providing a cavity including a solid medium including physical systems used as qubits, the cavity having a cavity mode which resonates with the physical systems;

irradiating the physical systems with operation light having a polarization direction crossing a wavefront of the cavity mode when the physical systems are coupled to each other by the cavity mode; and detecting a photon lost from the physical systems or from the cavity mode.

[8]: In the quantum calculation method set forth in [7], the solid medium includes a first part where the physical systems are arranged and a second part different from the first part, the first part being smaller than the second part in a thickness in a traveling direction of the operation light.

[9]: The quantum calculation method set forth in [7] or [8] further includes providing a first anti-reflective coating applied to a first surface of the solid medium on which the operation light is incident, a second anti-reflective coating applied to a second surface of the solid medium through which the operation light exits, and an optical trap or a light absorber arranged opposite to the second anti-reflective coating.

[10] A quantum calculation method according to a fifth aspect includes:

providing a cavity including a solid medium including a first part where physical systems used as qubits are arranged and a second part different from the first part, the cavity having a cavity mode which resonates with the physical systems, the first part being smaller than the second part in a thickness in a traveling direction of operation light to manipulate the physical systems;

irradiating the physical systems with the operation light while the physical systems are coupled to each other by the cavity mode; and detecting a photon lost from the physical systems or from the cavity mode.

[11]: The quantum calculation method set forth in [10], further includes providing a first anti-reflective coating applied to a first surface of the solid medium on which the operation light is incident, a second anti-reflective coating applied to a second surface of the solid medium through which the operation light exits, and an optical trap or a light absorber arranged opposite to the second anti-reflective coating.

[12]: A quantum calculation method according to a sixth aspect includes:

providing a cavity including a solid medium including physical systems used as qubits, the cavity having a cavity mode which resonates with the physical systems, a first anti-reflective coating; being applied to a first surface of the solid medium on which operation light to manipulate the physical systems is incident, a second anti-reflective coating applied to a second surface of the solid medium through which the operation light exits;

providing an optical trap or a light absorber arranged opposite to the second anti-reflective coating;

irradiating the physical systems with the operation light when the physical systems are coupled to each other by the cavity mode; and detecting a photon lost from the physical systems or from the cavity mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A quantum computer comprising:

a cavity including a solid medium including physical systems, the cavity having a cavity mode which resonates with the physical systems;

a light source unit which irradiates the physical systems with operation light having a polarization direction crossing a wavefront of the cavity mode when the physical systems are coupled by the cavity mode; and a detector which detects a photon from the physical systems or from the cavity mode.

2. The quantum computer according to claim 1, wherein the solid medium includes a first part where the physical systems are arranged and a second part different from the first part, the first part being smaller than the second part in a thickness in a traveling direction of the operation light.

3. The quantum computer according to claim 1, further comprising:

a first anti-reflective coating applied to a first surface of the solid medium on which the operation light is incident;

a second anti-reflective coating applied to a second surface of the solid medium through which the operation light exits; and an optical trap or a light absorber arranged opposite to the second anti-reflective coating.

4. The quantum computer according to claim 2, further comprising:

a first anti-reflective coating applied to a first surface of the solid medium on which the operation light is incident;

a second anti-reflective coating applied to a second surface of the solid medium through which the operation light exits; and an optical trap or a light absorber arranged opposite to the second anti-reflective coating.

5. The quantum computer according to claim 1, wherein the physical systems are used as qubits.

6. The quantum computer according to claim 1, wherein the photon is a photon lost from the physical systems or from the cavity mode.

7. A quantum computer comprising:

a cavity including a solid medium including a first part where physical systems are arranged and a second part different from the first part, the cavity having a cavity mode which resonates with the physical systems, the first part being smaller than the second part in a thickness in a traveling direction of operation light to manipulate the physical systems;

a light source unit which irradiates the physical systems with the operation light when the physical systems are coupled by the cavity mode; and a detector which detects a photon from the physical systems or from the cavity mode.

8. The quantum computer according to claim 7, further comprising:
a first anti-reflective coating applied to a first surface of the solid medium on which the operation light is incident;
a second anti-reflective coating applied to a second surface of the solid medium through which the operation light exits; and
an optical trap or a light absorber arranged opposite to the second anti-reflective coating.

9. The quantum computer according to claim 7, wherein the physical systems are used as qubits.

10. The quantum computer according to claim 7, wherein the photon is a photon lost from the physical systems or from the cavity mode.

11. A quantum computer comprising:
a cavity including a solid medium including physical systems, the cavity having a cavity mode which resonates with the physical systems, the cavity further including a first anti-reflective coating applied to a first surface of the solid medium on which operation light to manipulate the physical systems is incident, a second anti-reflective coating applied to a second surface of the solid medium through which the operation light exits;
an optical trap or a light absorber arranged opposite to the second anti-reflective coating;
a light source unit which irradiates the physical systems with the operation light when the physical systems are coupled by the cavity mode; and
a detector which detects a photon from the physical systems or from the cavity mode.

12. The quantum computer according to claim 11, wherein the physical systems are used as qubits.

13. The quantum computer according to claim 11, wherein the photon is a photon lost from the physical systems or from the cavity mode.

14. A quantum calculation method comprising:
providing a cavity including a solid medium including physical systems, the cavity having a cavity mode which resonates with the physical systems;
irradiating the physical systems with operation light having a polarization direction crossing a wavefront of the cavity mode when the physical systems are coupled by the cavity mode; and
detecting a photon from the physical systems or from the cavity mode.

15. The quantum calculation method according to claim 14, wherein the solid medium includes a first part where the physical systems are arranged and a second part different from the first part, the first part being smaller than the second part in a thickness in a traveling direction of the operation light.

16. The quantum calculation method according to claim 14, wherein a first anti-reflective coating is applied to a first surface of the solid medium on which the operation light is incident, and a second anti-reflective coating is applied to a second surface of the solid medium through which the operation light exits, and wherein the method further comprises providing an optical trap or a light absorber arranged opposite to the second anti-reflective coating.

17. The quantum calculation method according to claim 15, wherein a first anti-reflective coating is applied to a first surface of the solid medium on which the operation light is incident, and a second anti-reflective coating is applied to a second surface of the solid medium through which the operation light exits, and wherein the method further comprises providing an optical trap or a light absorber arranged opposite to the second anti-reflective coating.

18. A quantum calculation method comprising:
providing a cavity including a solid medium including a first part where physical systems are arranged and a second part different from the first part, the cavity having a cavity mode which resonates with the physical systems, the first part being smaller than the second part in a thickness in a traveling direction of operation light to manipulate the physical systems;
irradiating the physical systems with the operation light while the physical systems are coupled by the cavity mode; and
detecting a photon from the physical systems or from the cavity mode.

19. The quantum calculation method according to claim 18, wherein a first anti-reflective coating is applied to a first surface of the solid medium on which the operation light is incident, and a second anti-reflective coating is applied to a second surface of the solid medium through which the operation light exits, and wherein the method further comprises providing an optical trap or a light absorber arranged opposite to the second anti-reflective coating.

20. A quantum calculation method comprising:
providing a cavity including a solid medium including physical systems, the cavity having a cavity mode which resonates with the physical systems, a first anti-reflective coating being applied to a first surface of the solid medium on which operation light to manipulate the physical systems is incident, a second anti-reflective coating applied to a second surface of the solid medium through which the operation light exits;
providing an optical trap or a light absorber arranged opposite to the second anti-reflective coating;
irradiating the physical systems with the operation light when the physical systems are coupled by the cavity mode; and
detecting a photon from the physical systems or from the cavity mode.

* * * * *